United States Patent [19]

Deeba et al.

[11] Patent Number: 4,458,092

[45] Date of Patent: Jul. 3, 1984

[54] HIGHLY ACTIVE CATALYSTS FOR METHANOL AMINATION

[75] Inventors: Michel Deeba, Emmaus; Robert N. Cochran, West Chester, both of Pa.

[73] Assignee: Air Products and Chemicals, Inc., Allentown, Pa.

[21] Appl. No.: 344,164

[22] Filed: Jan. 29, 1982

[51] Int. Cl.³ .............................................. C07C 85/06
[52] U.S. Cl. .................................................. 564/479
[58] Field of Search ........................................ 564/479

[56] References Cited

U.S. PATENT DOCUMENTS

| | | | |
|---|---|---|---|
| 2,113,241 | 4/1938 | Punnett | 564/479 |
| 3,384,667 | 5/1968 | Hamilton | 260/585 |
| 4,082,805 | 4/1978 | Kaeding | 260/585 |
| 4,191,709 | 3/1980 | Parker et al. | 260/583 |
| 4,205,012 | 5/1980 | Parker et al. | 260/583 |
| 4,217,240 | 8/1980 | Bergna | 564/479 XR |
| 4,229,374 | 10/1980 | Slaugh et al. | 260/563 |
| 4,254,061 | 3/1981 | Weigert | 564/479 |
| 4,370,503 | 1/1983 | Brake | 564/479 XR |
| 4,374,273 | 2/1983 | Heinsohn | 564/479 |

*Primary Examiner*—Paul F. Shaver
*Attorney, Agent, or Firm*—Michael Leach; E. Eugene Innis; James C. Simmons

[57] ABSTRACT

A process for improving the methanol conversion rate in the reaction of methanol and ammonia to produce methylamines which comprises effecting the reaction in the presence of a highly acidic dehydrated aluminosilicate catalyst manifesting microporous diffusivity for the methylamines. Rare earth Y zeolite and hydrogen exchanged Y zeolite are the preferred catalysts.

9 Claims, No Drawings

4,458,092

HIGHLY ACTIVE CATALYSTS FOR METHANOL AMINATION

TECHNICAL FIELD

This invention relates to the preparation of methylamines by a catalytic reaction between methanol and ammonia.

BACKGROUND OF THE INVENTION

The catalyzed reaction of methanol and ammonia to produce the mono-, di-, and trimethylamines is well known in the art. Presently, the methylamines are produced commercially by a continuous process for methanol and ammonia using an amorphous silica-alumina catalyst. This continuous process yields an equilibrium controlled distribution of the methylamines.

U.S. Pat. No. 3,384,667 discloses a method for producing monosubstituted and disubstituted amines in preference to trisubstituted amines by reacting ammonia with an alcohol in the presence of a crystalline metal aluminosilicate catalyst having pores of a diameter that pass the monosubstituted and disubstituted amine products but are too small to pass the trisubstituted amine product. Hydrogen exchanged crystalline aluminosilicates are defined as crystalline metal aluminosilicates in the patent.

U.S. Pat. No. 4,082,805 discloses a process for the production of aliphatic amines by reaction of a $C_1$–$C_5$ alcohol or ether with ammonia in the presence of a catalyst comprising a crystalline aluminosilicate having the structure of ZSM-5, ZSM-11 or ZSM-21, at 300° to 500° C. and at one atmosphere to 1000 psig pressure, the feed rate of alcohol or ether and ammonia being within the ratio of 1:1 to 5:1 g/hr.

U.S. Pat. No. 4,191,709 discloses a process for the manufacture of amines by reacting an alcohol with ammonia in the presence of the hydrogen form of zeolite FU-1 or zeolite FU-1 in which some or all of the protons have been replaced by bivalent or trivalent cations. The related U.S. Pat. No. 4,205,012 is similar except that the catalyst comprises zeolite FU-1 in which some or all of the protons have been replaced by monovalent cations, for example, sodium.

U.S. Pat. No. 4,229,374 discloses a process for producing tertiary amines by reacting alcohols with ammonia, primary amines or secondary amines in the presence of a specific catalyst. The catalyst comprises a mixture of copper, tin and an alkali metal supported on a suitable carrier, such as artificial and natural zeolites.

U.S. Pat. No. 4,254,061 discloses a process for producing monomethylamine by reacting methanol and ammonia, in such amounts so as to provide a C/N ratio, from the methanol and ammonia reactants, of 0.5–1.5, over a catalyst which is (a) mordenite wherein the primary cation is Li, Na, HNa having at least 2% Na by weight, K, Ca, Sr, Ba, Ce, Zn or Cr; (b) ferrierite wherein the primary metal cation is Li, Na, K, Ca, Sr, Ba, Ce or Fe; (c) erionite ore; (d) calcium erionite; or (e) clinoptilolite ore.

With a silica-alumina catalyst, reactor inlet temperatures of about 600° to 650° F. (316° to 343° C.) are typically used. The maximum temperature in the reactor must be maintained below about 800° F. (427° C.) to avoid thermal and wall reactions that lead to hydrocarbon by-products, catalyst coking and poor yields. The amination reactions are exothermic, so that in an adiabatic plugged flow reactor the temperature rises by 150°–450° F. (66°–232° C.) depending on the ammonia:methanol feed ratio. With an inlet temperature of about 600° to 650° F. (316° to 343° C.) and such maximum temperature restriction, the feed ratio of ammonia:methanol is limited to about 2.2:1 or higher in order to avoid a temperature rise in the reactor in excess of 800° F. (427° C.) with the attendant high temperature problems. Thus, improving methanol conversion rates would offer advantages such as lower reactor inlet temperatures permitting lower ammonia:methanol feed ratios and less excess ammonia to handle.

SUMMARY OF THE INVENTION

In accordance with this invention, there is provided a method for improving the methanol conversion rates in the production of methylamines by the reaction of methanol with ammonia in the presence of a catalyst. The invention comprises reacting methanol and ammonia under conversion conditions in the presence of a highly acidic dehydrated aluminosilicate catalyst having a silicon to aluminum (Si:Al) ratio of at least about 2.0 and manifesting microporous diffusivity for the methylamines.

Such highly acidic aluminosilicates were unexpectedly much less effective for the amination of a higher alcohol; that is to say that these highly acidic catalysts surprisingly showed methanol conversion rates which were greatly improved compared to amorphous silica-alumina while their ethanol conversion rates showed a smaller improvement at lower temperatures and were less than silica-alumina conversion rates at higher temperatures. The selectivity to the formation of methylamines was high in contrast to the ethanol conversion situation in which the yield of ethylene was relatively high.

Suitable catalysts for practicing the process of this invention are rare earth exchanged Y zeolite (REY zeolite) and hydrogen exchanged Y zeolite (H-Y zeolite).

Since the highly acidic dehydrated aluminosilicate catalysts are more active, i.e., show greater enhanced activity at lower temperatures, advantageously lower inlet temperatures can be used while achieving the same methanol conversion rates previously achieved with prior art catalysts.

Thus, the process of this invention permits the use of lower ammonia:methanol ratios in the feed stream without exceeding 800° F. (427° C.) in the reactor, i.e. use less excess ammonia in the reaction and remain below 800° F.

In addition, where a catalyst, for example, exhibits an x-fold increase in methanol conversion rate over a prior art catalyst, the substitution of such catalyst in the methylamines production scheme for the prior art catalyst means the scheme could advantageously be operated at the same temperature with a reactor 1/x the size while maintaining the same methylamines output, or the production capacity could be increased x-fold using the same size reactor; both represent considerable capital savings.

Several other advantages associated with the inventive process are the following:

Energy savings on preheating of the feed streams are realized because of a lower starting feed temperature.

Since lower ammonia:methanol ratios can be used at lower inlet temperatures, less excess ammonia needs to be separated from the reaction products by distillation.

The ammonia distillation column can be much smaller and thus consume less energy.

A much wider range of ammonia:methanol feed ratio is possible. Monomethylamine/dimethylamine/trimethylamine product splits are also a function of the ammonia:methanol ratio, and therefore a wider range of product splits can be made using a catalyst that allows a lower feed temperature and wider range of the ammonia:methanol feed ratio.

In addition, thermal reactions leading to by-products and catalyst coking should be less at lower temperatures.

DETAILED DESCRIPTION OF THE INVENTION

Briefly, the invention relates to an improved catalytic process for preparing methylamines from methanol and ammonia. More particularly, the invention provides surprisingly improved methanol conversion rates by contacting methanol with ammonia in the presence of a highly acidic dehydrated aluminosilicate catalyst having a Si:Al ratio of about 2.0 or greater, preferably 2.5 or greater, and possessing microporous diffusivity for the methylamines.

Alcohol amination requires acidic materials to perform the reaction. The higher the acidity of the material, in terms of the number and strength of acidic sites in a zeolitic catalyst, the higher should be the rate for alcohol amination.

The complete description of surface acidic properties of a solid with high surface area must involve the determination of the acid strength $H_o$, the density, the nature and the position of acidic sites. However, the surface heterogeneity complicates the measuring of acidic distribution and its correlation with catalytic activity. Thus a comparison of the acidity and activity properties of different materials is not straight forward due to the absence of a quantitative model for relating the physicochemical properties of different surfaces.

Therefore, an ammonia adsorptivity procedure which gives the distribution of acid sites as a function of temperature was chosen for evaluating the acidity of a catalyst surface. It has been discovered that a material which shows high ammonia adsorptivity and therefore high acidity does not, by itself, mean it is a good catalyst for methanol amination. On the other hand, a material which shows very low acidity by the ammonia adsorptivity procedure would be expected to give low methanol conversion rates.

The ammonia adsorptivity procedure which was used for measuring the acidity of solid surfaces is the following:

Acidity distribution was measured using a thermal gravimetric analysis technique with ammonia as the adsorbate. The acidity measurement was performed by activating about 20 to 40 mg of a catalyst at temperatures up to 400° C. in helium after which the catalyst was cooled to 25° C. The catalyst was then exposed to ammonia. The uptake of ammonia by the catalysts was very fast and the catalyst surface was saturated within five minutes.

Helium was then used to desorb the physically adsorbed ammonia at 25° C. followed by desorption by heating the catalyst to 100°, 200°, 300° and 400° C., respectively. The temperature was raised to the next level after there was no change in the rate of desorption as indicated by decreasing weight of the catalyst. The amount of irreversibly adsorbed ammonia at each temperature was taken as a count of acidic sites. The amount of irreversibly adsorbed ammonia at 25° and 100° C. was considered as a measurement of total acidity (both weakly and strongly acidic sites) and that amount of ammonia irreversibly adsorbed at 200° and 300° C. as a measurement of strongly acidic sites. The strongly acidic sites are believed to be the important locales for the amination reaction.

TABLE I

Irreversibly Adsorbed Ammonia (mmole/g catalyst)

| Catalyst | Temperature (°C.) | | | | |
|---|---|---|---|---|---|
| | 25 | 100 | 200 | 300 | 400* |
| H-erionite | 4.0 | 1.9 | 1.5 | 1.0 | — |
| H-mordenite | 3.3 | 2.2 | 1.4 | 0.56 | — |
| REY zeolite | 3.3 | 1.8 | 0.9 | 0.4 | — |
| H-Y zeolite | 3.6 | 2.3 | 1.2 | 0.5 | — |
| silica-alumina (amorph) | 0.3 | 0.09 | trace | — | — |

*At 400° C. ammonia desorption was complete.

Table I shows the acidity values of various zeolite catalysts in terms of millimoles of irreversibly adsorbed ammonia per gram of catalyst at the designated temperatures. As one characteristic of the dehydrated crystalline aluminosilicate catalysts suitable for practicing the process of this invention, the catalyst should be able to irreversibly adsorb at least 0.5 mmole ammonia, preferably 0.8 mmole ammonia, per gram of catalyst at 200° C.

Acidity measurement of a catalyst using a small molecule like ammonia as an adsorbate would be misleading if it is to be the sole basis for predicting activity. An additional limiting factor for catalytic activity over zeolites is possibly the critical diameter of the reactant and/or product molecules. Only those molecules that can pass through the zeolitic intracrystalline pores would be reacted or formed.

Microporous diffusivity, therefore, has great significance in catalytic reactions over crystalline aluminosilicates. Accordingly, it is believed that some combination of or balance between the acidity and microporous diffusivity of the catalyst contributes to increased conversion rates for the amination of methanol.

Methanol, ammonia, mono-, di- and trimethylamines have a critical diameter that requires three dimensional intracrystalline pore channels of at least about 7 Angstroms diameter to allow for their diffusion through the catalyst. Therefore, the crystalline aluminosilicates used in the process of this invention must meet this criterion. Table II shows the intracrystalline pore diameters of various materials:

TABLE II

| Zeolite | Channel System[a] (°A) | Type of Channels (dimensions) | Face Dimension of Cavities[b] (°A) | Si:Al Ratio[c] |
|---|---|---|---|---|
| Erionite | 3.6 × 5.2 | 3 | 6.3 × 13.0 | 3–3.5 |
| Chabazite | 3.6 × 3.7 | 3 | 6.5 × 11.0 | 1.6–3.0 |
| Mordenite | 6.7 × 7.0 | 1 | — | 4.5–5.0 |
| | 2.9 × 5.7 | | — | |
| A | 4.1 | 3 | 11.4 | 1.0 |
| X | 7.4 | 3 | 11.8 | 1.2 |
| Y | 7.4 | 3 | 11.8 | 2.5 |
| ZSM-5 | 5.4 × 5.6 | 3 | — | 3 |
| | 5.1 × 5.5 | | | |

TABLE II-continued

| Zeolite | Channel System[a] (°A) | Type of Channels (dimensions) | Face Dimension of Cavities[b] (°A) | Si:Al Ratio[c] |
|---|---|---|---|---|
| silica-alumina | amorphous | | | |

[a] Meier and Olson, Atlas of Zeolite Structure Type, 1978
[b] Bauer, R. M., Molecular Sieves, Adv. Chem. Ser., ACS, 121,1 (1978)
[c] Breck, D. W., Zeolite Molecular Sieves, John Wiley & Sons, 1974.

The preferred catalysts of the invention which satisfy the acidity, Si:Al ratio and microporous diffusivity criteria are REY zeolite and H-Y zeolite. They provide much superior methanol conversion rates compared to the prior art silica-alumina catalyst.

The above mentioned catalysts which are useful in the process of the invention are commonly available or can be prepared readily by one skilled in the art from commercially available aluminosilicates. The following is a general preparative procedure for making a hydrogen exchanged catalyst:

The H-exchanged zeolites can be prepared by mixing extrusions of the sodium or potassium form of the zeolite with aqueous 2M ammonium chloride in appropriate amounts under controlled pH of about 3-4. The mixture is then refluxed for several hours (8-12 hr). The supernatant is decanted and the aqueous ammonium chloride treatment is repeated two more times. Finally, the solids are removed, washed with water under reflux conditions, air-dried and calcined at 400° C.

Metal ion exchanged aluminosilicate catalysts can be also prepared from extrusions of the sodium or potassium form by methods well known to those in the art.

Process variables of this invention include the ammonia:methanol ratio, temperature, pressure and contact time or flow rate expressed in terms of gas hourly space velocity (GHSV).

Generally, the mole ratio of ammonia to methanol may range from about 1:1 to 5:1, and preferably ranges from about 1.5:1 to 2.5:1. If monomethylamine is the desired product, it is advantageous to carry out the process with the proportion of ammonia to methanol in a stoichiometric excess, e.g. up to about 3:1 or more.

In the preparation of the methylamines according to the process of this invention, the reaction is maintained at a temperature from about 450° F. (232° C.) to about 800° F. (427° C.), and preferably from about 550°-750° F. (288° to 399° C.). If the temperature is too low, the conversion of methanol and ammonia to methylamines will be low requiring excessive contact times or, equivalently, low flow rates. If the temperature is too high, hydrocarbon by-product formation and catalyst coking becomes a significant problem.

The pressure utilized for carrying out the reaction is between about 1 to 50 atmospheres with a range of about 10 to 30 atmospheres being preferred.

Generally, flow rates (GHSV) of about 1000 to 30,000 ml of methanol/cc of catalyst/hour, preferably 5000 to 15,000 ml of methanol/cc of catalyst/hour, may be used.

Contemplated as the operative, or functional, equivalent of methanol for use in the process of this invention is its ether derivative, dimethyl ether.

The invention resides in the unexpectedly superior methanol conversion rates associated with the highly acidic dehydrated aluminosilicate catalysts having three dimensional intracrystalline pore openings of at least about 7-8 Angstroms, using amorphous silica-alumina as a basis of comparison. In contrast, the ethanol conversion rates for these catalysts showed a lesser degree of improvement over silica-alumina at temperatures of 650° F. or less and, surprisingly, were inferior at 750° F. The term methanol conversion rate means the rate at which methanol is converted to methylamines per gram of catalyst as expressed by the equation:

$$\text{Rate} = \frac{\text{g-mole } (MMA + 2DMA + 3TMA)}{\text{g-catalyst-second}}$$

where MMA=monomethylamine, DMA=dimethylamine and TMA=trimethylamine.

The following examples illustrate the nature of the process described herein and are not intended to limit the scope of the invention.

EXAMPLES 1-6

A series of runs 1-6 were made to produce methylamines. Ammonia and methanol in such amounts so as to provide an ammonia:methanol molar ratio of about 2:1 were passed over about 5.34 grams of catalyst in a Berty recycle reactor which is a fixed bed reactor with a large (greater than 20) internal recycle ratio. Under these conditions the Berty reactor is gradientless and behaves like a continually stirred tank reactor (CSTR). Rates of reaction can be calculated directly as moles converted per gram of catalyst per second of residence time.

The reaction was performed at a total pressure of 18 atmospheres at a gas hourly space velocity of 9300 and at a variety of temperatures from 550° to 750° F. (288° to 399° C.). The reactor feeds and effluent were analyzed by an on-line calibrated gas chromatograph. The streams were maintained gaseous from the reactor to the chromatograph sampling valve.

The catalysts tested were amorphous silica-alumina, H-mordenite, 5A zeolite, REY zeolite, H-Y zeolite, and H-erionite.

The amorphous silica-alumina was a Ketjen LA-30 catalyst. The 5A zeolite was a calcium cation exchanged sodium A zeolite. The REY zeolite was Union-Carbide's SK-500 rare earth exchanged zeolite catalyst. The remaining hydrogen exchanged aluminosilicate catalysts, namely H-Y zeolite, H-erionite and H-mordenite were prepared according to the previously described general procedure for hydrogen exchange from Na Y zeolite, erionite ore and sodium mordenite, respectively.

Table III sets forth the methanol conversion rates in terms of gram-mole methanol/grams catalyst-second for the catalyst tested at the designated temperatures.

The 5A zeolite catalyst suffered from poor hydrothermal stability at the higher temperatures which, it is believed, explains its approach to the behavior of amorphous silica-alumina at about 700° F. (371° C.) and the lack of data at 750° F. (399° C.). This instability is related to its low Si:Al ratio of about one. A Si:Al ratio of about 2.0 or greater is required in the zeolite for it to have the necessary hydrothermal stability at the conversion conditions for the amination of methanol.

Thus the thermal and hydrothermal stability of catalysts used in methanol amination are important. Ultrastable H-Y and REY zeolites prepared according to the teaching in U.S. Pat. No. 3,293,192 and McDaniel and Maher, "Molecular Sieves", Society of the Chemical Industry, London, 186 (1968) are therefore preferred catalysts for they possess very high hydrothermal stability.

TABLE III

METHANOL CONVERSION RATES
(g mol CH$_3$OH/g cat sec)

| CATALYST | 550° F. (288° C.) | 600° F. (316° C.) | 650° F. (343° C.) | 700° F. (371° C.) | 750° F. (399° C.) |
|---|---|---|---|---|---|
| 1 - Silica-alumina | $5.0 \times 10^{-7}$ | $1.5 \times 10^{-6}$ | $5.2 \times 10^{-6}$ | $1.5 \times 10^{-5}$ | $3.7 \times 10^{-5}$ |
| 2 - 5A zeolite | $24.7 \times 10^{-7}$ | $5.4 \times 10^{-6}$ | $12.3 \times 10^{-6}$ | $2.0 \times 10^{-5}$ | — |
| 3 - REY zeolite | $160 \times 10^{-7}$ | $29 \times 10^{-6}$ | $39 \times 10^{-6}$ | — | $7.3 \times 10^{-5}$ |
| 4 - H-erionite | $75 \times 10^{-7}$ | $14.3 \times 10^{-6}$ | $23.7 \times 10^{-6}$ | $3.4 \times 10^{-5}$ | $4.6 \times 10^{-5}$ |
| 5 - H-mordenite | $67.5 \times 10^{-7}$ | $17.3 \times 10^{-6}$ | $24.5 \times 10^{-6}$ | $3.25 \times 10^{-5}$ | $3.8 \times 10^{-5}$ |
| 6 - H-Y zeolite | $96.5 \times 10^{-7}$ | $23 \times 10^{-6}$ | $37 \times 10^{-6}$ | $5.1 \times 10^{-5}$ | $5.7 \times 10^{-5}$ |

The conversion rates of the various aluminosilicate catalysts are compared to the prior art amorphous silica-alumina catalyst in Table IV. As can be seen from the data in Table IV, the aluminosilicate catalysts of the inventive process, namely REY zeolite and H-Y zeolite, exhibited superior methanol conversion rates in the temperature range from about 550° F. (288° C.) to about 750° F. (399° C.). At temperatures of about 600° F. (316° C.) or below these particular catalysts afforded extraordinarily high methanol conversion rates compared to amorphous silica-alumina. At 700° F. (371° C.) and 750° F. (399° C.), REY and H-Y zeolite showed methanol conversion rates which were at least 50% higher than H-mordenite and 5A zeolite which were approaching silica-alumina in activity at these temperatures.

microporous diffusivity combined in the REY and H-Y zeolites to afford higher methanol conversion rates.

Based on the methanol conversion rates, the tested catalysts would be ranked in order of decreasing activity at the various temperatures in the following manner:

| | |
|---|---|
| 550° F. (288° C.) | REY zeolite > H-Y zeolite > H-erionite > H-mordenite > 5A zeolite > silica-alumina |
| 650° F. (343° C.) | REY zeolite > H-Y zeolite > H-mordenite ≃ H-erionite > 5A-zeolite > silica-alumina |
| 750° F. (399° C.) | REY zeolite > H-Y zeolite > H-erionite > H-mordenite > silica-alumina |

All the zeolites tested showed higher methanol con-

TABLE IV

COMPARISON OF METHANOL CONVERSION RATES
(ALUMINOSILICATE CATALYST/SILICA-ALUMINA CATALYST)

| CATALYST | 550° F. (288° C.) | 600° F. (316° C.) | 650° F. (343° C.) | 700° F. (371° C.) | 750° F. (399° C.) |
|---|---|---|---|---|---|
| 1 - Silica-alumina | 1 | 1 | 1 | 1 | 1 |
| 2 - 5A zeolite | 4.9 | 3.6 | 2.4 | 1.3 | — |
| 3 - REY zeolite | 32 | 19 | 7.5 | — | 2.0 |
| 4 - H-erionite | 15 | 9.5 | 4.6 | 2.3 | 1.2 |
| 5 - H-mordenite | 14 | 12 | 4.7 | 2.2 | 1.0 |
| 6 - H-Y zeolite | 19 | 15 | 7.1 | 3.4 | 1.5 |

TABLE V

COMPARISON OF METHYLAMINES PRODUCT SPLIT
(mole % MMA, mole % DMA, mole % TMA)

| CATALYST | 550° F. (288° C.) | 600° F. (316° C.) | 650° F. (343° C.) | 700° F. (371° C.) | 750° F. (399° C.) |
|---|---|---|---|---|---|
| 1 - Silica-alumina | (59, 25, 15) | (35, 11, 43) | (31, 27, 42) | (33, 27, 40) | (34, 28, 37) |
| 2 - 5A zeolite | (82, 18, 0) | (70, 30, 0) | (56, 31, 13) | (38, 31, 31) | — |
| 3 - REY zeolite | (26, 22, 53) | (21, 29, 50) | (23, 33, 44) | — | (31, 37, 32) |
| 4 - H-erionite | (87, 13, 0) | (81, 19, 0) | (74, 26, 0) | (67, 33, 0) | (60, 34, 6) |
| 5 - H-mordenite | (82, 18, 0) | (65, 22, 13) | (57, 25, 18) | (55, 26, 19) | (54, 25, 21) |
| 6 - H-Y zeolite | (58, 20, 22) | (43, 38, 19) | (37, 42, 21) | (39, 39, 22) | (43, 34, 23) |

Table V shows the methylamines product split in the reactor effluent stream. The mole %'s of monomethylamine (MMA), dimethylamine (DMA) and trimethylamine (TMA) were calculated based on the areas under the chromatogram curves for each amine, with response factors determined using measured blends of the amines.

Mono- and dimethylamine were formed over H-erionite with small amounts of trimethylamine at high temperatures. Trimethylamine is formed with no restriction over REY and H-Y zeolite. The acidity of REY and H-Y zeolite is less than that of H-erionite at 200° C. (Table I), but the formation of trimethylamine over REY and H-Y zeolite due to higher microporous diffusivity is responsible for the higher catalytic activity compared to H-erionite. Thus, high acidity and better version rates than silica-alumina due to their higher acidity. However, the trend of acidity and activity for methanol amination did not correlate because of the three dimensional intracrystalline pore structure. Larger pores would form trimethylamine which quickly increases the methanol conversion rate. Thus, the high acidity of the REY and H-Y zeolites accompanied by the larger pores (7 Angstroms) and cavities (d=12 Angstroms) makes these materials superior catalysts for methanol conversion especially at low temperatures (low conversions) where the reaction is not as diffusion limited as at high temperatures (high conversions).

The amination of ethanol is more complicated because larger molecules are being formed and there are side reactions. The activity of H-erionite, for example, is lower than that of silica-alumina even though its acidity is much higher. Apparently the controlling factor is diffusivity. The following Examples 7-11 show that the catalysts which were more active than silica-alumina for methanol amination were suprisingly not nearly as active for ethanol amination and yielded large amounts of ethylene at the higher temperatures.

EXAMPLES 7-11

The procedure for Examples 1-6 was followed replacing methanol with ethanol. Table VI shows the ethanol conversion rates for the various catalysts. Table VII compares these rates to amorphous silica-alumina and Table VIII shows the amount of ethylene produced.

TABLE VI

Ethanol Conversion Rates
(g mole $C_2H_5OH$/g cat sec)

| CATALYST | TEMPERATURE | | |
|---|---|---|---|
| | 550° F. (288° C.) | 650° F. (343° C.) | 750° F. (399° C.) |
| 7 - silica-alumina | $0.36 \times 10^{-7}$ | $1.4 \times 10^{-6}$ | $4.6 \times 10^{-6}$ |
| 8 - REY zeolite | $2.3 \times 10^{-7}$ | $3.4 \times 10^{-6}$ | $3.7 \times 10^{-6}$ |
| 9 - HY zeolite | $4.0 \times 10^{-7}$ | $3.4 \times 10^{-6}$ | $3.8 \times 10^{-6}$ |
| 10 - H-mordenite | $0.4 \times 10^{-7}$ | $0.84 \times 10^{-6}$ | $1.9 \times 10^{-6}$ |
| 11 - H-erionite | nil | $1.1 \times 10^{-6}$ | $2.6 \times 10^{-6}$ |

TABLE VII

Comparison of Ethanol Conversion Rates
(Aluminosilicate Catalyst/Silica-Alumina Catalyst)

| CATALYST | TEMPERATURE | | |
|---|---|---|---|
| | 550° F. (288° C.) | 650° F. (343° C.) | 750° F. (399° C.) |
| 7 Silica-alumina | 1 | 1 | 1 |
| 8 REY zeolite | 6.5 | 2.5 | 0.8 |
| 9 H-Y zeolite | 11 | 2.5 | 0.8 |
| 10 H-mordenite | 1 | 0.6 | 0.5 |
| 11 H-erionite | nil | 0.8 | 0.6 |

TABLE VIII

Ethylene Yield (%)

| CATALYST | TEMPERATURE | | |
|---|---|---|---|
| | 550° F. (288° C.) | 650° F. (343° C.) | 750° F. 399° C.) |
| 7 Silica-alumina | 0 | 0 | 4.7 |
| 8 REY zeolite | 0 | 10 | 38 |
| 9 H-Y zeolite | 0 | 3 | 36 |
| 10 H-mordenite | 0 | 4 | 21 |
| 11 H-erionite | 0 | 10 | 42 |

From Tables VI, VII and VIII it can be seen that, in general, the acidic aluminosilicate catalysts were not as active for ethanol amination as would have been expected based on their acidity and their methanol amination activity.

Based on the ethanol conversion rates, the catalysts would be rated in order of decreasing activity in the following manner:

| 550° F. (288° C.) | H-Y zeolite > REY zeolite > H-mordenite ≈ silica-alumina >> H-erionite |
|---|---|
| 650° F. (343° C.) | H-Y zeolite = REY zeolite > silica-alumina > H-erionite > H-mordenite |
| 750° F. (399° C.) | silica-alumina > H-Y zeolite ≈ REY zeolite > H-erionite > H-mordenite |

At 550° F. (288° C.) and 650° F. (343° C.) the rate of ethanol conversion for the REY and H-Y zeolites was higher than for silica-alumina. At 750° F. (399° C.), however, the rate of conversion over silica-alumina was higher than for any of the aluminosilicates in spite of the much lower acidity of silica-alumina.

A study of the methanol and ethanol conversion rates of the various catalysts compared to amorphous silica-alumina (Tables IV and VII) shows that the REY zeolite rates were 32 and only 6.5 at 550° F.; 7.5 and only 2.5 at 650° F.; and 2.0 and only 0.8 at 750° F., respectively. The H-Y zeolite rates for methanol and ethanol conversion as compared to amorphous silica-alumina were 19 and 11 at 550° F.; 7.1 and 2.5 at 650° F.; and 1.5 and 0.8 at 750° F., respectively. While the methanol conversion rates for H-mordenite and H-erionite were better than for silica-alumina, the ethanol conversion rates were only comparable at 550° F. and inferior at 650° and 750° F. Thus the catalysts of this invention were surprisingly more effective for methanol conversion than for higher alcohol conversion.

Although the combination of high acidity and diffusivity is essential to ethanol conversion rates, micro- and macroporous diffusivity apparently has a greater impact in contrast to the methanol conversion situation. Thus silica-alumina was the most effective catalyst for ethanol conversion because of its high porosity.

The reaction of ethanol, and probably higher alcohols, with ammonia was shown to be quite different from methanol amination. High selectivity to amines and almost no by-products were observed with methanol over the crystalline aluminosilicates. Ethanol conversion over the same aluminosilicates indicated higher activity which was misleading since careful analysis of the products showed that selectivity to amines was much lower than for the methanol reaction. A high yield of ethylene (Table VII) was observed for the ethanol reaction which may be related to very high acidity of the catalysts or the poor diffusivity of the reactants and products, or both.

STATEMENT OF INDUSTRIAL APPLICATION

The inventive process provides an improved rate of conversion for methanol in its reaction with ammonia to produce the commercially valuable methylamines which are employed in tanning and in organic synthesis to manufacture compounds such as surface active agents, fungicides and insecticides for agriculture.

We claim:

1. In a process for producing methylamines from the reaction of methanol with ammonia in the presence of a catalyst, the method for improving methanol conversion rates which comprises reacting the methanol and ammonia under conversion conditions in the presence of a highly acidic, dehydrated aluminosilicate catalyst which irreversibly adsorbs at least 0.5 millimoles of ammonia per gram of catalyst at about 200° C., has a silicon to aluminum ratio of at least about 2.0, and has three dimensional intracrystalline pore channels of at least about 7 Angstroms.

2. The method of claim 1 wherein the methanol and ammonia are reacted at a temperature from about 450°-800° F. and a pressure from 1-50 atmospheres.

3. The method of claim 2 wherein the highly acidic, dehydrated aluminosilicate catalyst irreversibly adsorbs at least 0.8 mmoles ammonia per gram of catalyst at about 200° C.

4. The method of claims 1 or 2 wherein the catalyst is rare earth Y zeolite.

5. The method of claims 1 or 2 wherein the catalyst is hydrogen exchanged Y zeolite.

6. In a process for producing methylamines from the reaction of methanol with ammonia in the presence of a catalyst, the method which comprises reacting the methanol and ammonia in the presence of a dehydrated crystalline aluminosilicate which irreversibly adsorbs at least 0.8 millimoles of ammonia per gram of catalyst at about 200° C., has a Si:Al ratio of at least about 2.5 and has three dimensional intracrystalline pores of at least about 7-8 Angstroms, at a temperature from about 550°-750° F., a pressure from 1-50 atmospheres, a gas hourly space velocity of 1,000-30,000 ml methanol/cc catalyst/hour and an ammonia:methanol molar feed ratio of about 1:1 to 5:1.

7. The invention of claim 6 wherein the catalyst is rare earth Y zeolite.

8. The method of claim 6 wherein the catalyst is hydrogen exchanged Y zeolite.

9. The method of claim 1 wherein a methylamine is recovered.

* * * * *

UNITED STATES PATENT AND TRADEMARK OFFICE
CERTIFICATE OF CORRECTION

PATENT NO. : 4,458,092
DATED : July 3, 1984
INVENTOR(S) : Michel Deeba and Robert N. Cochran It is certified that error appears in the above-identified patent and that said Letters Patent are hereby corrected as shown below:

Column 12, Line 5
  Delete "invention" and substitute therefor -- method --

Signed and Sealed this

Fifth Day of March 1985

[SEAL]

Attest:

DONALD J. QUIGG

Attesting Officer   Acting Commissioner of Patents and Trademarks